US006654731B1

(12) United States Patent
Mahesh (10) Patent No.: US 6,654,731 B1
(45) Date of Patent: Nov. 25, 2003

(54) AUTOMATED INTEGRATION OF TERMINOLOGICAL INFORMATION INTO A KNOWLEDGE BASE

(75) Inventor: Kavi Mahesh, Santa Clara, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/260,621

(22) Filed: Mar. 1, 1999

(51) Int. Cl.[7] ................................................. G06N 5/02
(52) U.S. Cl. ........................................ 706/45; 707/101
(58) Field of Search ............................. 382/159; 704/9, 704/257; 707/101, 102; 706/45

(56) References Cited

U.S. PATENT DOCUMENTS

| | | | | |
|---|---|---|---|---|
| 5,164,899 A | * | 11/1992 | Sobotka et al. | 704/9 |
| 5,371,807 A | * | 12/1994 | Register et al. | 382/159 |
| 5,715,468 A | * | 2/1998 | Budzinski | 704/9 |
| 5,748,841 A | * | 5/1998 | Morin et al. | 704/257 |
| 6,272,495 B1 | * | 8/2001 | Hetherington | 707/101 |
| 6,289,353 B1 | * | 9/2001 | Hazlehurst et al. | 707/102 |

* cited by examiner

Primary Examiner—Wilbert L. Starks, Jr.
(74) Attorney, Agent, or Firm—Stattler Johansen & Adeli LLP (57) ABSTRACT

A terminological system automates the integration of terminological information into a built-in knowledge base. Input terminology information, which includes input terms and information that specifies relationships among at least two of the input terms, is input to the terminological system. The terminological system parses the input terminology information to generate a logical structure that depicts relationships among the input terms in a format compatible with the built-in knowledge base. Either an independent ontology, comprising the logical structure, is generated, or the knowledge base is extended by logically coupling the logical structure to a node that matches the input term. The terminological system also resolves conflicts if an input term that matches a terminological node in the knowledge base connotes a different meaning than the terminological node. A system that converts broader term and narrower term relationships, synonym relationships, related term (RT) relationships, and preferred term (PT) relationships in accordance with the ISO 2788 standard is disclosed.

15 Claims, 10 Drawing Sheets

AUTOMATED INTEGRATION OF TERMINOLOGICAL INFORMATION INTO A KNOWLEDGE BASE

BACKGROUND OF THE INVENTION

1. Field of the Invention

The present invention is directed toward the field of knowledge bases for use in natural language processing systems, and more particularly toward integrating thesauri from disparate sources into a single knowledge base.

2. Art Background

In general, knowledge bases include information arranged to reflect ideas, concepts, or rules regarding a particular problem set. Knowledge bases have application for use in natural language processing systems (a.k.a. artificial linguistic or computational linguistic systems). These types of knowledge bases store information about language. Specifically, natural language processing knowledge bases store information about language, including how terminology relates to other terminology in that language. For example, such a knowledge base may store information that the term "buildings" is related to the term "architecture," because there is a linguistic connection between these two terms.

Natural language processing systems use knowledge bases for a number of applications. For example, natural language processing systems use knowledge bases of terminology to classify information. One example of such a natural language processing system is described in U.S. Pat. No. 5,694,523, entitled "Content Processing System for Discourse," issued to Kelly Wical on Dec. 2, 1997, which is expressly incorporated herein by reference. Terminological knowledge bases also have application for use in information search and retrieval systems. In this application, a knowledge base may be used to identify terms related to the query terms input by a user. One example for use of a knowledge base in an information search and retrieval system is described in U.S. patent application Ser. No. 09/095,515, entitled "Hierarchical Query Feedback in an Informative Retrieval System," by Mohammad Faisal, filed on Jun. 10, 1998 and U.S. patent application Ser. No. 09/170,894, entitled "Ranking of Query Feedback Terms in an Information Retrieval System," by Mohammad Faisal and James Conklin, filed on Oct. 13, 1998, both of which are incorporated herein by reference.

Natural language processing systems, including information search and retrieval systems, may be applied to domain specific applications. For example, a natural language processing system may process and classify information (e.g., documents) about medicine for a system tailored for the medical profession. For this example, a natural language processing system may compile and classify thousands of documents related to medicine. A commercially available natural language processing system may include a general knowledge base, that includes terminology from a wide range of topics. However, this general knowledge base may not include specific terminology relating to a domain specific application. A user of the natural language processing system for the medical application may desire to augment the general knowledge base with terms specific to medicine. For example, the user may desire to augment the knowledge base to include terms that classify specific types of blood disorders. As illustrated by the above example, it would be impossible for a commercial developer of a knowledge base to thoroughly include all topics or domains of interest to all users. Accordingly, it is desirable to provide a means for a user to add domain or topic specific terminological information into a built-in knowledge base. It is also desirable to provide an automated means to enter the terminological information to facilitate easy use of a system, as well as provide a seamless integration of domain specific terms and a general built-in knowledge base.

SUMMARY OF THE INVENTION

A terminological system automates the integration of terminological information into a knowledge base. The system contains a built-in knowledge base comprising a plurality of nodes, which represent terminology, arranged to depict relationships among the terminology. Input terminology information, which includes a plurality of input terms and information that specifies relationships among at least two of the input terms, is input to the terminological system. The terminological system parses the input terminology information to generate a logical structure that depicts relationships among the input terms in a format compatible with the built-in knowledge base. A determination as to whether at least one input term exists as a node in the knowledge base is made, and if there is no corresponding node, then an independent ontology comprising the logical structure is generated. If at least one input term exists as a node in the knowledge base, then the knowledge base is extended by logically coupling the logical structure to a node that matches the input term. The terminological system also resolves conflicts if an input term that matches a terminological node in the knowledge base connotes a different meaning than the terminological node.

In one embodiment, the input terminology information is received in an ISO 2788 format. For this embodiment, the input terminology information may include broader term and narrower term relationships among two input terms for conversion to parent-child and child-parent relationships in the built-in knowledge base. The input terminology information may also include synonym relationships between two terms for conversion to parent-child relationships between a common parent node in the knowledge base and the input terms specified as synonym relationships. Furthermore, the input terminology information may include related term (RT) relationships among at least two input terms for conversion to cross references between terms comprising a related term (RT) relationship in the input terminological information. In addition, the input terminology information may include preferred term (PT) relationships among at least two input terms for conversion to a canonical/alternate form index between terms comprising a preferred term (PT) relationship in the input terminological information.

DETAILED DESCRIPTION

Figure 1:
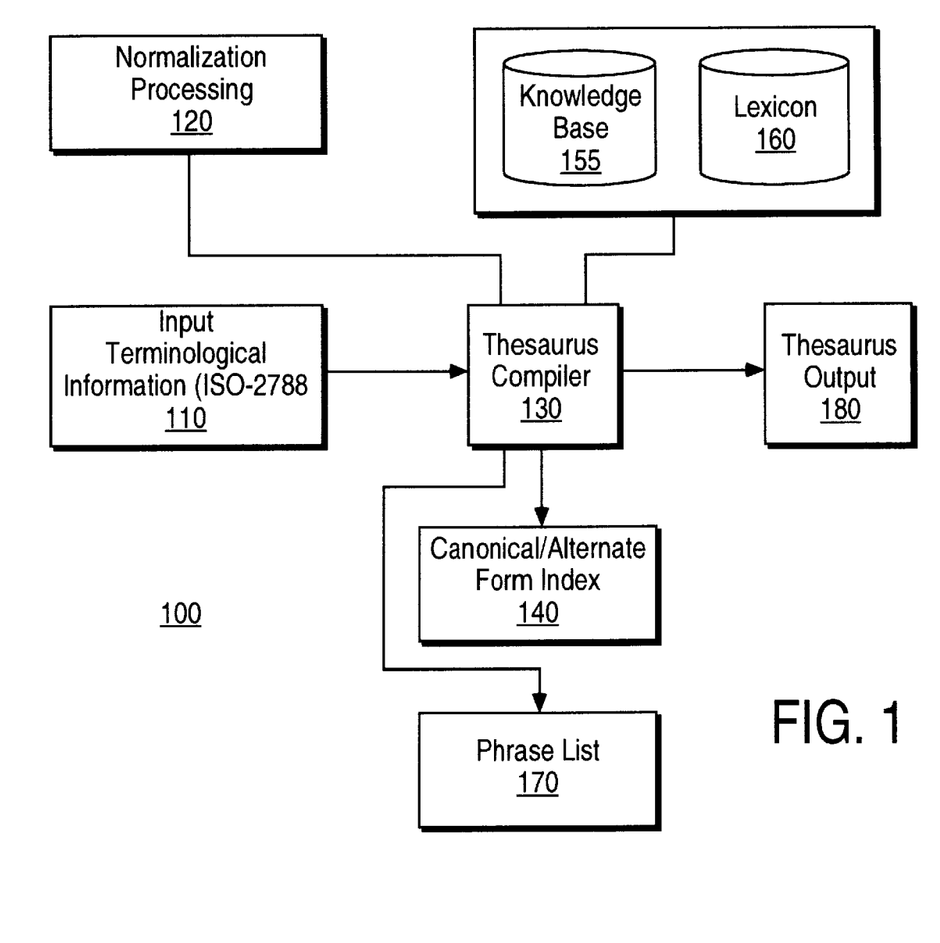
FIG. 1 is a block diagram illustrating one embodiment for a system that automates integration of terminological information into a knowledge base.

FIG. 1 is a block diagram illustrating one embodiment for a system that automates integration of terminological information into a knowledge base. For this embodiment, a terminological system 100 receives, as input, input terminological information 110, and generates, as output, thesaurus output 180. In general, input terminological information 110 comprises multiple terms, as well as information that relates at least two terms. For example, input terminological information may include the terms "hepatitis" and "blood diseases", and the information that "blood diseases" is a broader term than the term "hepatitis." In one embodiment, input terminological information 110 conforms to the International Standards Organization (ISO) 2788 for generating thesaurus standardized data. A discussion of the ISO-2788 thesaurus is discussed more fully below.

Figure 8:
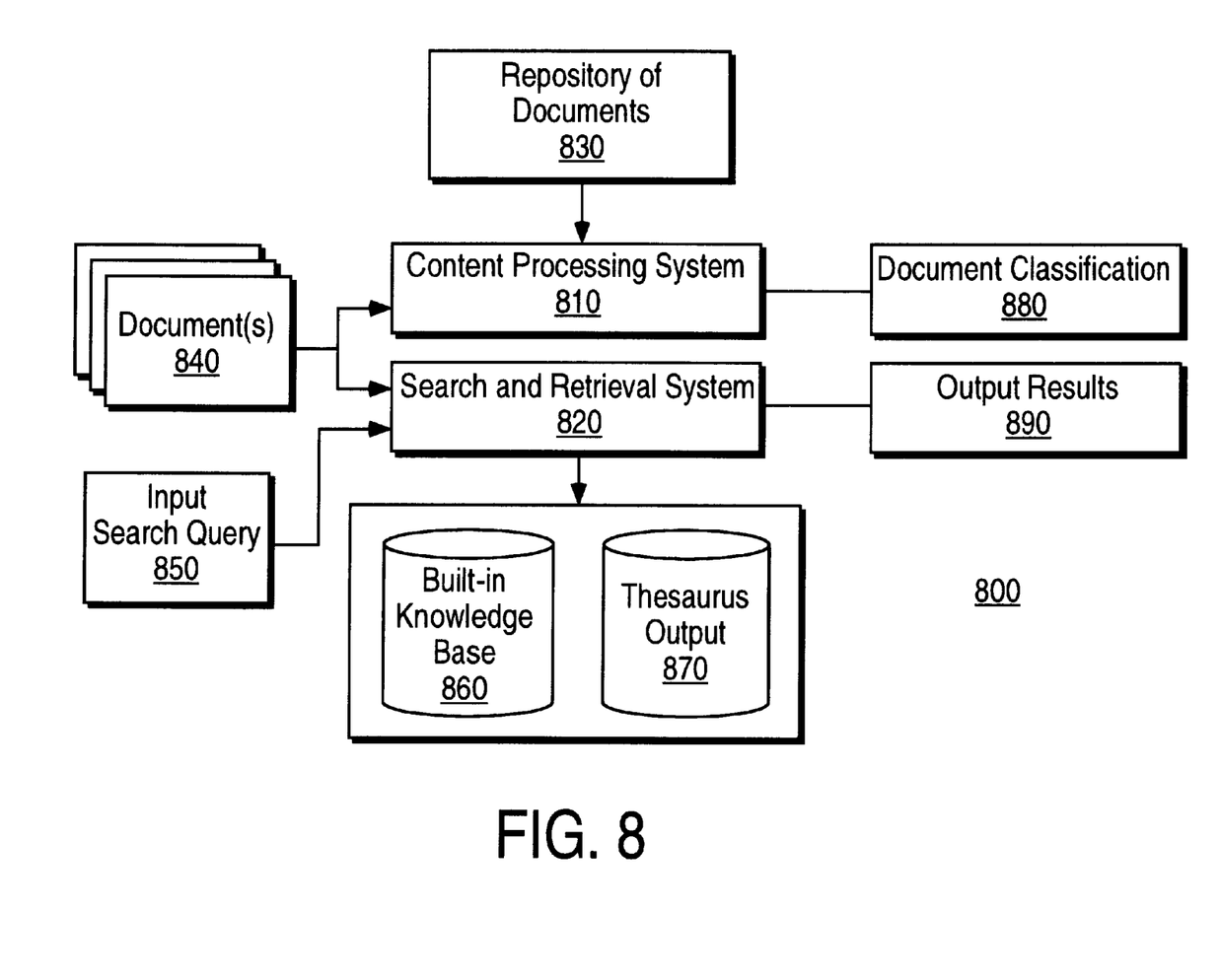
FIG. 8 is a block diagram illustrating one embodiment for a natural language processing system incorporating the integrated knowledge base of the present invention.

In general, the thesaurus output 180 comprises a plurality of files for use as a specialized knowledge base in a natural language processing system (See FIG. 8). The content of thesaurus output 180 is described more fully below. The engine for the terminological system 100 comprises a thesaurus compiler 130. The thesaurus compiler 130 processes the input terminological information, and through use of morphological information, generates the thesaurus output 180. In general, the thesaurus output 180 comprises a knowledge base that includes the built-in knowledge base (e.g., knowledge base 155), as well as terminology set forth in the input terminological information 110. In one embodiment, thesaurus compiler 130 operates in conjunction with normalization processing 120. If used, normalization processing 120 generates alternate forms of the terms set forth in input terminological information 110. In general, in nominalization processing, given a term, the goal is to analyze and manipulate its language dependent features until a language independent ontological representation is found.

For the embodiment of FIG. 1, the morphological section includes a knowledge base 155, a lexicon 160, as well as a plurality of indices (i.e., canonical/alternate form index 140 and phrase list 170). The knowledge base 155, illustrated as the system built-in knowledge base, includes a plurality of terms, as well as information on how certain terms relate to other terms.

In general, the knowledge base 155 is the repository for all knowledge about languages and about the concrete and abstract worlds described by language in human discourse. The knowledge base 155 contains two major types of data: language specific data necessary to describe a language used for human discourse, and language independent data necessary to describe the meaning of human discourse. One embodiment for the knowledge base 155 is described more fully below in the section "Knowledge Base."

The lexicon 160 stores a plurality of terms and phrases, including information about those words. In one embodiment, lexicon 160 contains definitional characteristics for each word. For example, one definitional characteristic defines the part of speech for the corresponding word, such as whether the word is a common noun. Lexicon 160 also identifies the amount of content carrying information for a corresponding word. One embodiment for a lexicon is described in U.S. Pat. No. 5,694,523, issued to Kathy Wical on Dec. 2, 1997, in Appendix A, entitled "Lexicon Documentation." U.S. Pat. No. 5,694,523, including all of the Appendices, is expressly incorporated herein by reference.

The canonical/alternate form index 140 provides a mapping between a preferred or canonical form of a word, and one or more alternate forms of the word. For example, the term "physician" may be the preferred term for the word "doctors", when in a medical context. Phrase list 170 lists a plurality of phrases in their preferred form. For example, a canonical form of the phrase "personal computers" may be "PC." For this example, the index identifies that the preferred term to use for "personal computers" is the term "PC."

In one embodiment, input terminological information 110 is formatted in compliance with the ISO-2788. For this embodiment, user extensions to the knowledge base 155 are in the form of the ISO-2788 thesaurus. Terms in the input terminological information 110 may have single or multiple words with punctuation if necessary. The maximum length of a term is eighty characters. Per the ISO-2788 standard, terms may be related to one another in any one of the following standard relations: broader term (BT); narrower term (NT); related term (RT); top term (TT); preferred term (PT), and synonym (SYN). In one embodiment, the terminological system 100 processes broader term generic (BTG) and broader term partitive (BPT) as the same as broader term (BT). Similarly, the relations narrower term generic (NTG) and narrower term partitive (NPT) are interpreted as the same as the relation narrower term (NT).

Broader term (BT) and narrower term (NT) relations describe a hierarchical relationship such that the terms are related in a category/subcategory relationship. For example, the term "political geography" is a narrower term (NT) than the broader term "geography." A related term relation defines terms that do not have a hierarchical relationship (i.e., broader or narrower term relation), but nevertheless the terms have a semantic or usage association. For example, the term "Eiffel Tower" may have a related term relationship with the term "Paris." A top term (TT) relation describes a term that is the highest or broadest level term in a hierarchical relationship with other terms. The preferred term (PT) relation specifies that a preferred term is to be used instead of the identified alternate form. The synonym (SYN) relation defines that the two terms identified are synonyms, and thus should have sibling relationships in a hierarchical organization of terms (i.e., the term should reside in the same level of a hierarchical structure).

Knowledge Base

The knowledge base 155 consists of general categories (also referred to herein as leaf nodes), concepts, and cross-references (i.e., Xrefs). Concepts, or detailed categories, are a subset of the canonical forms determined by the language dependent data. These concepts themselves are language independent. In different languages their text representations may be different; however, these terms represent the universal ontological location. Concepts are typically thought of as identification numbers that have potentially different representations in different languages. These representations are the particular canonical forms in those languages. General categories are themselves concepts, and have canonical form representations in each language. These categories have the additional property that other concepts and general categories can be associated with them to create a knowledge hierarchy. Cross references are links between general categories. These links augment the ancestry inks that are generated by the associations that form a directed graph.

The ontology in the knowledge base 155 contains only canonical nouns and noun phrases, and it is the normalization processing 120 (FIG. 1) that provides mappings from non-nouns and non-canonical nouns. The organization of the knowledge base 155 provides a world view of knowledge, and therefore the ontology actually contains only ideas of canonical nouns and noun phrases. The text representation of those ideas is different in each language, but the ontological location of the ideas in the knowledge base 155 remains the same for all languages.

The organizational part of the knowledge base 155 is the structured category hierarchy comprised at the top level of general categories. These categories represent knowledge about how the world is organized. The hierarchy of general categories is a standard tree structure. In one embodiment, a depth limit of sixteen levels is maintained. The tree organization provides a comprehensive structure that permits augmentation of more detailed information. The tree structure results in a broad but shallow structure. The average depth from tree top to a leaf node is five, and the average number of children for non-leaf nodes is 4.5.

In the knowledge base 155, the tree structure is arranged in a plurality of independent ontologies (i.e., each ontology comprises an independent tree structure). In one embodiment, the knowledge base 155 contains six independent ontologies. For purpose of nomenclature, the categories in each tree structure are defined as leaf node categories. Terminology associated with a leaf node category are defined as "concepts." Typically, a concept provides less topic orientation than a leaf node category.

There are two types of general categories: concrete and abstract. This distinction is an organizational one only and it has no functional ramifications. A concrete category is one that represents a real-world industry, field of study, place, technology or physical entity. The following are examples of concrete categories: "chemistry", "computer industry", "social identities", "Alabama", and "Cinema." An abstract category is one that represents a relationship, quality, fielding or measure that does not have an obvious physical real-world manifestation. The following examples are abstract categories: "downward motion", "stability", "stupidity, foolishness, fools", "mediation, pacification", "texture", and "shortness."

Many language dependent canonical forms that map to the language independent concepts are stored as the knowledge base 155. Each concept is any idea found in the real world that can be classified or categorized as being closely associated with one and only one knowledge base 155 general category. Similarly, any canonical form in a particular language can map to one and only one concept. For example, there is a universal concept for the birds called "cranes" in English, and a universal concept for the machines called "cranes" in English. However, the canonical form "cranes" does not map to either concept in English due to its ambiguity. In another language, which may have two different canonical forms for these concepts, mapping may not be a problem. Similarly, if "cranes" is an unambiguous canonical form in another language, then no ambiguity is presented in mapping.

Cross references are mappings between general categories that are not directly ancestrally related, but that are close to each other ontologically. Direct ancestral relationship means parent-child, grandparent-grandchild, great grandparent-great grandchild, etc. Cross references reflect a real-world relationship or common association between the two general categories involved. These relationships can usually be expressed by universal or majority quantification over one category. Examples of valid cross references and the relationships are shown in Table 1.

TABLE 1 oceans --> fish (all oceans have fish)
belief systems --> moral states (all belief systems address moral states)
electronics --> physics (all electronics deals with physics)
death and burial --> medical problems (most cases of death and burial are caused by medical problems)

Cross references are not automatically bidirectional. For example, in the first entry of Table 1, although oceans are associated with fish, because all oceans have fish, the converse may not be true since not all fish live in oceans. The names for the general categories are chosen such that the cross references that involve those general categories are valid with the name or label choices. For example, if there is a word for fresh water fish in one language that is different than the word for saltwater fish, the oceans to fish cross reference is not valid if the wrong translation of fish is used. Although the knowledge base 155 is described as cross linking general categories, concepts may also be linked without deviating from the spirit and scope of the invention.

Figure 2:
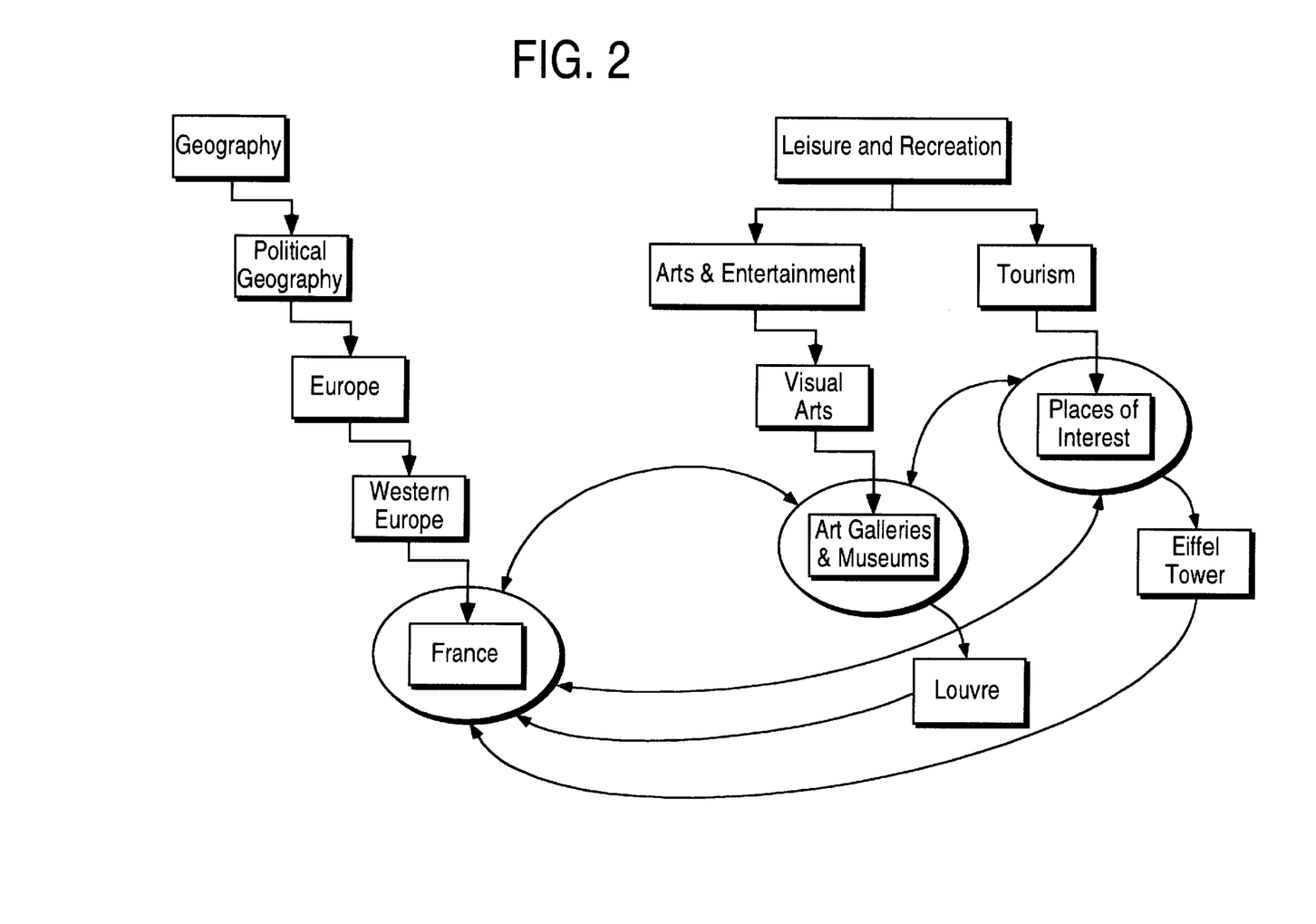
FIG. 2 illustrates an example portion of a knowledge base augmented to include additional terminology as well as cross references and links among categories and terms.

FIG. 2 illustrates an example portion of a knowledge base augmented to include additional terminology as well as cross references and Links among categories and terms. The classification hierarchy and notations shown in FIG. 2 illustrate an example that classifies a document on travel or tourism, and more specifically on traveling to France and visiting museums and places of interest. As shown in FIG. 2, the classification categories (e.g., knowledge base 155) contains two independent static ontologies, one ontology for "geography", and a second ontology for "leisure and recreation." The "geography" ontology includes categories for "political geography", "Europe", "Western Europe", and "France." The categories "arts and entertainment" and "tourism" are arranged under the high level category "leisure and recreation." The "visual arts" and the "art galleries and museums" are subcategories under the "arts and entertainment" category, and the category "places of interest" is a subcategory under the category "tourism."

The knowledge base 155 is augmented to include linking and cross referencing among categories for which a linguistic, semantic, or usage association has been identified. For the example illustrated in FIG. 2, the categories "France", "art galleries and museums", and "places of interest" are cross referenced and/or linked as indicated by the circles, which encompass the category names, as well as the lines and arrows. This linking and/or cross referencing indicates that the categories "art galleries and museums" and "places of interest" may appear in the context of "France."

For this example, the knowledge base 155 indicates that the Louvre, a proper noun, is classified under the category "art galleries and museums", and further associates the term "Louvre" to the category "France." Similarly, the knowledge base 155 indicates that the term "Eiffel Tower" is classified under the category "places of interest", and is also associated with the category "France."

The knowledge base 155 may be characterized, in part, as a directed graph. The directed graph provides information about the linguistic, semantic, or usage relationships among categories, concepts and terminology. The "links" or "cross references" on the directed graph, which indicate the associations, is graphically depicted in FIG. 2 using lines and arrows. For the example shown in FIG. 2, the directed graph indicates that there is a linguistic, semantic, or usage association among the concepts "France", "art galleries and museums", and "places of interest."

Terminological System Embodiments

In one embodiment, the terminological system 100 (FIG. 1) provides a mapping among relations in the input terminological information 110, stored as ISO-2788, and relations as stored in a knowledge base 155. Table 2 includes two columns to show a mapping from the ISO-2788 and the knowledge base embodiment described above. As shown in Table 2, the mapping provides a one to one correspondence between relations defined by the ISO-2788 standard and the relations defined by the knowledge base 155 embodiment.

TABLE 2

| ISO-2788 | Knowledge Base |
| --- | --- |
| BT | parent category |
| NT | child category |
| SYN | sibling with a common parent category |
| RT | cross reference (Xref), both directions |
| PT | canonical form |

Figure 3:
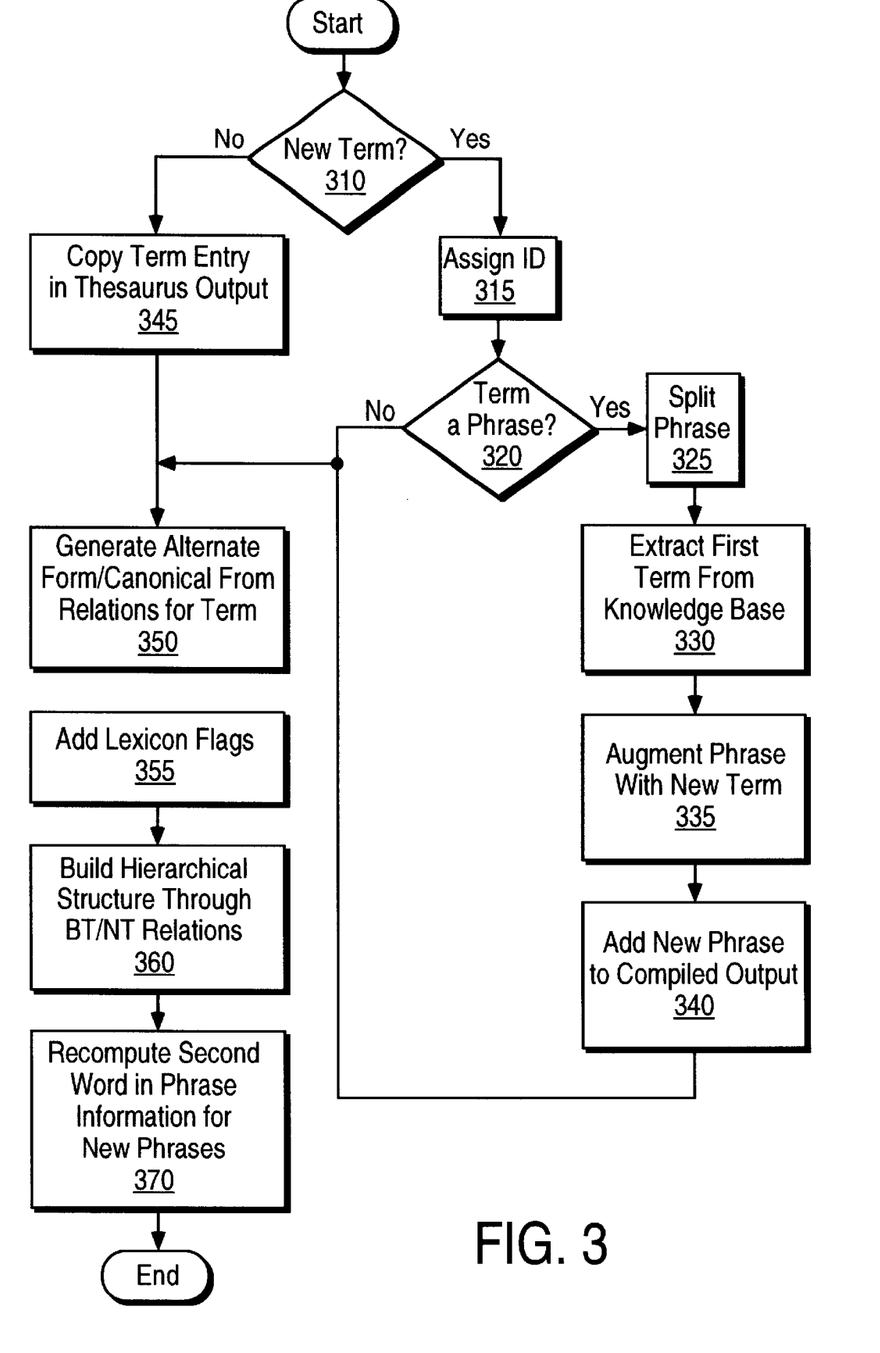
FIG. 3 is a flow diagram illustrating one embodiment for the thesaurus compiler of the present invention.

FIG. 3 is a flow diagram illustrating one embodiment for the thesaurus compiler of the present invention. If a term in the input terminological information 110 is a new term, then an identification (ED) is assigned (blocks 310 and 315, FIG. 3). If the term is a phrase, then the phrase is split and the first term of the phrase is extracted from the knowledge base 155 (blocks 320, 325, and 330). The phrase is augmented with a new term, and the augmented knowledge base and the entire entry for the term is added to the thesaurus output 180 so as to override the entry in the knowledge base (blocks 335 and 340). If the input term is not a new term, then the term is copied into the thesaurus output 180 (blocks 310 and 345, FIG. 3). Alternate form/canonical form relations are generated for the term for storage in canonical/alternate form index 140 (block 350). Lexicon flags (e.g., definitional characteristics) are added for input terms currently existing in the knowledge base 155 (block 355). For this embodiment, no information regarding definitional characteristics are included for new terms.

Logical structures are built to depict broader term and narrower term hierarchical relations (block 360, FIG. 3). For new phrases, the second word in the phrase information for each new phrase in the thesaurus output is re-computed (block 370). For all second words that exist in the knowledge base 155, their entries are copied to the thesaurus output 180 if their status changes (i.e., a word that did not have this characteristic set is now flagged because it occurs in the second position in the new phrase). In one embodiment, the output entries in the thesaurus output 180 are generated in a compressed form for file storage. In addition, an index is built on these output files for fast look-up of individual terms.

If a related term (RT) involves an existing knowledge base term, then the knowledge base term is extracted, and the cross-reference relation is added to the knowledge base (blocks 375, 380 and 385, FIG. 3). Also, the cross-reference relation is added to the thesaurus output 180 (block 390, FIG. 3). The thesaurus compiler generates bi-directional cross-references from the related term (RT) relations (block 395, FIG. 3).

Figure 4:
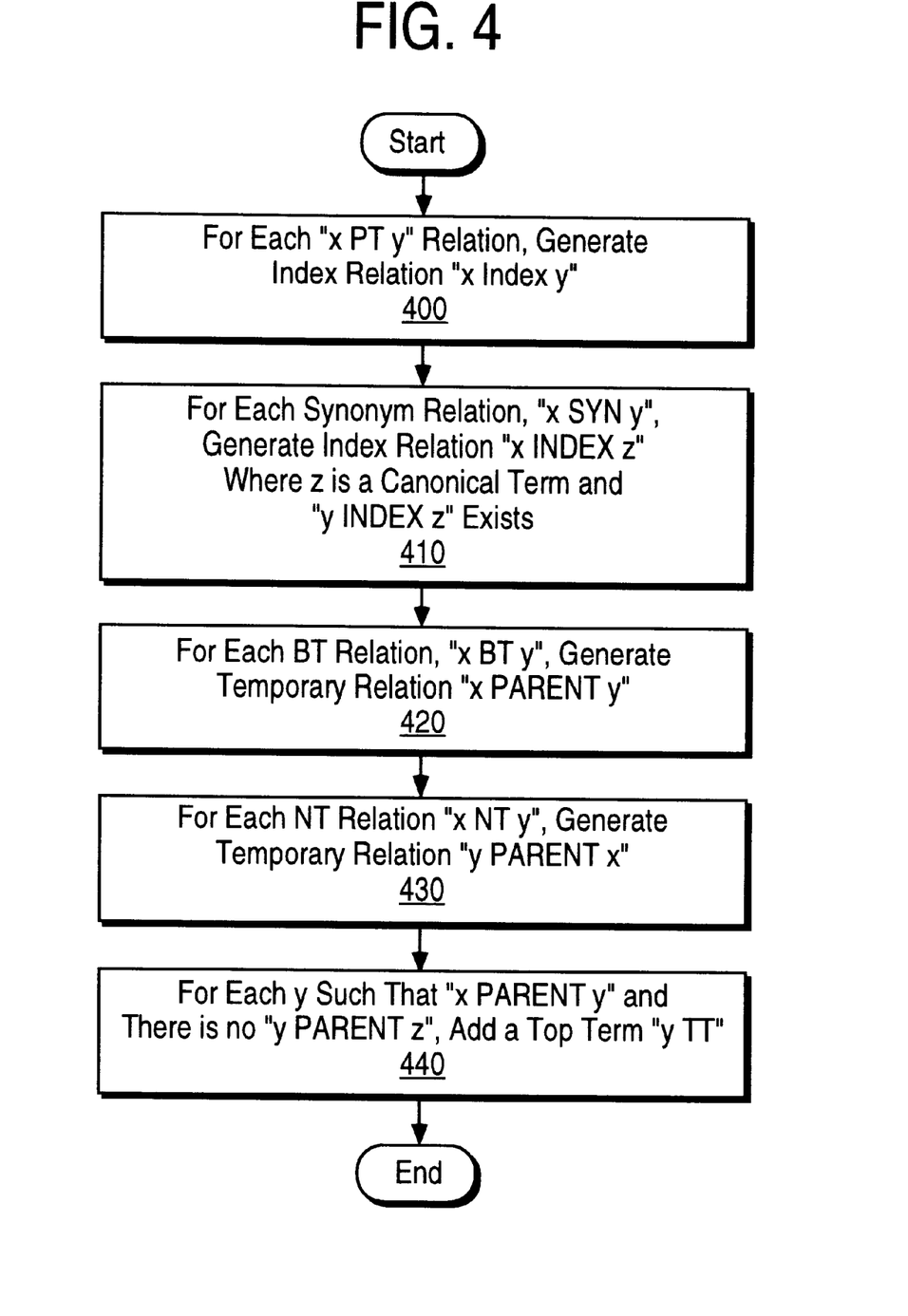
FIG. 4 is a flow diagram illustrating one embodiment for mapping an ISO-2788 entry to a knowledge base.

FIG. 4 is a flow diagram illustrating one embodiment for mapping an ISO-2788 entry to a knowledge base. For each preferred term relation, "X PT Y", an index relation, "X INDEX Y", is generated (block 400, FIG. 4). For this relation, Y is added to the list of canonical terms (e.g., canonical/alternative form index 140). For each synonym relation, "X SYN Y", an index relation, "X INDEX Z", is generated, where Z is a canonical term and "Y INEX Z" exists (block 410). For each broader term relation, "X BT Y", a temporary relation, "X PARENT Y", is generated (block 420, FIG. 4). Similarly, for each narrower term relation, "X NT Y", a temporary relation, "Y PARENT X", is generated (block 430, FIG. 4). In addition, for each Y such that "X PARENT Y", and there is no "Y PARENT Z", a top term relation, "Y TT 0", is generated (block 440, FIG. 4).

Figure 5A:
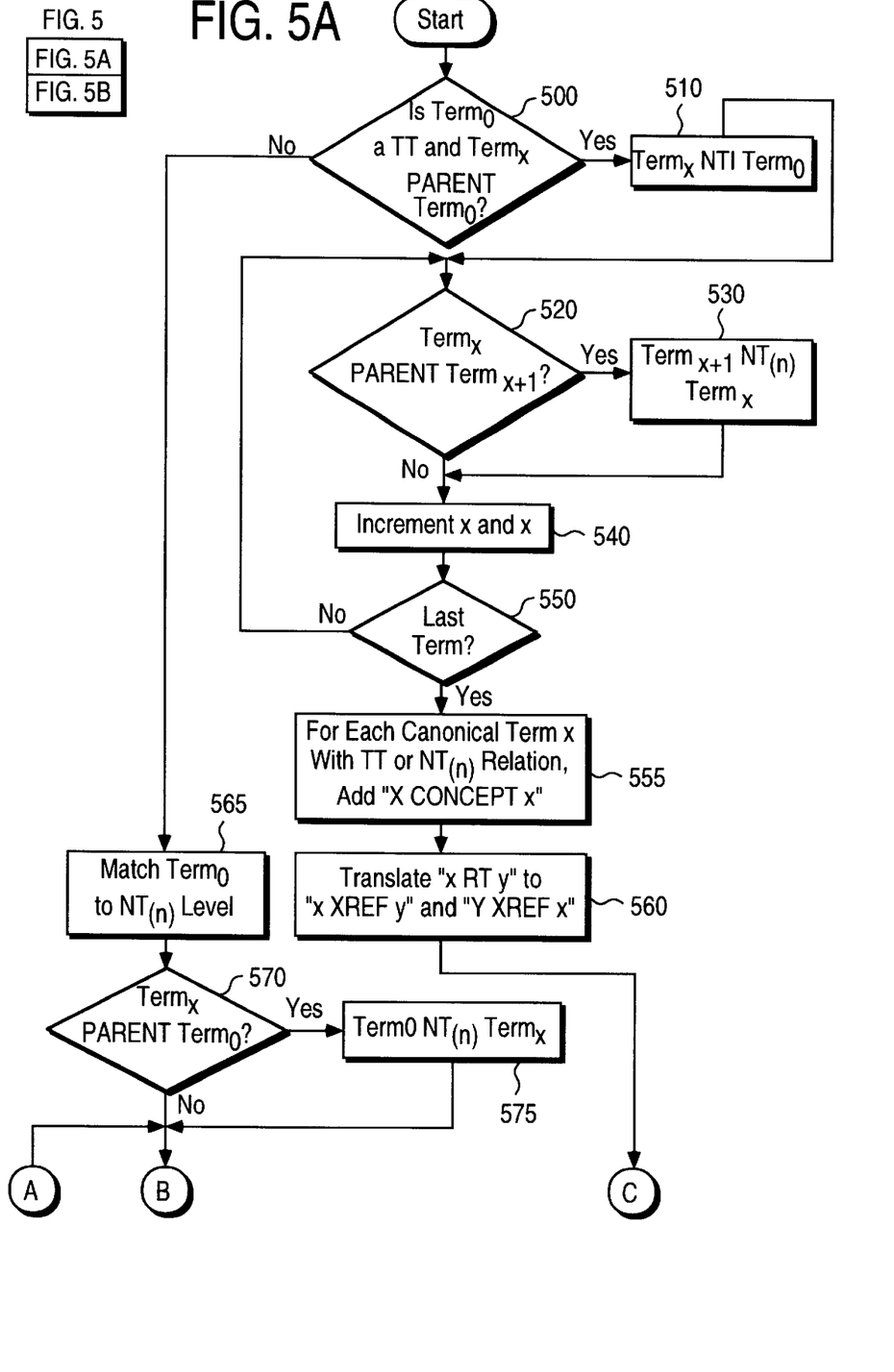
FIG. 5 is a flow diagram illustrating one embodiment for building a logical structure for hierarchical relations and cross-references.
Figure 5B:
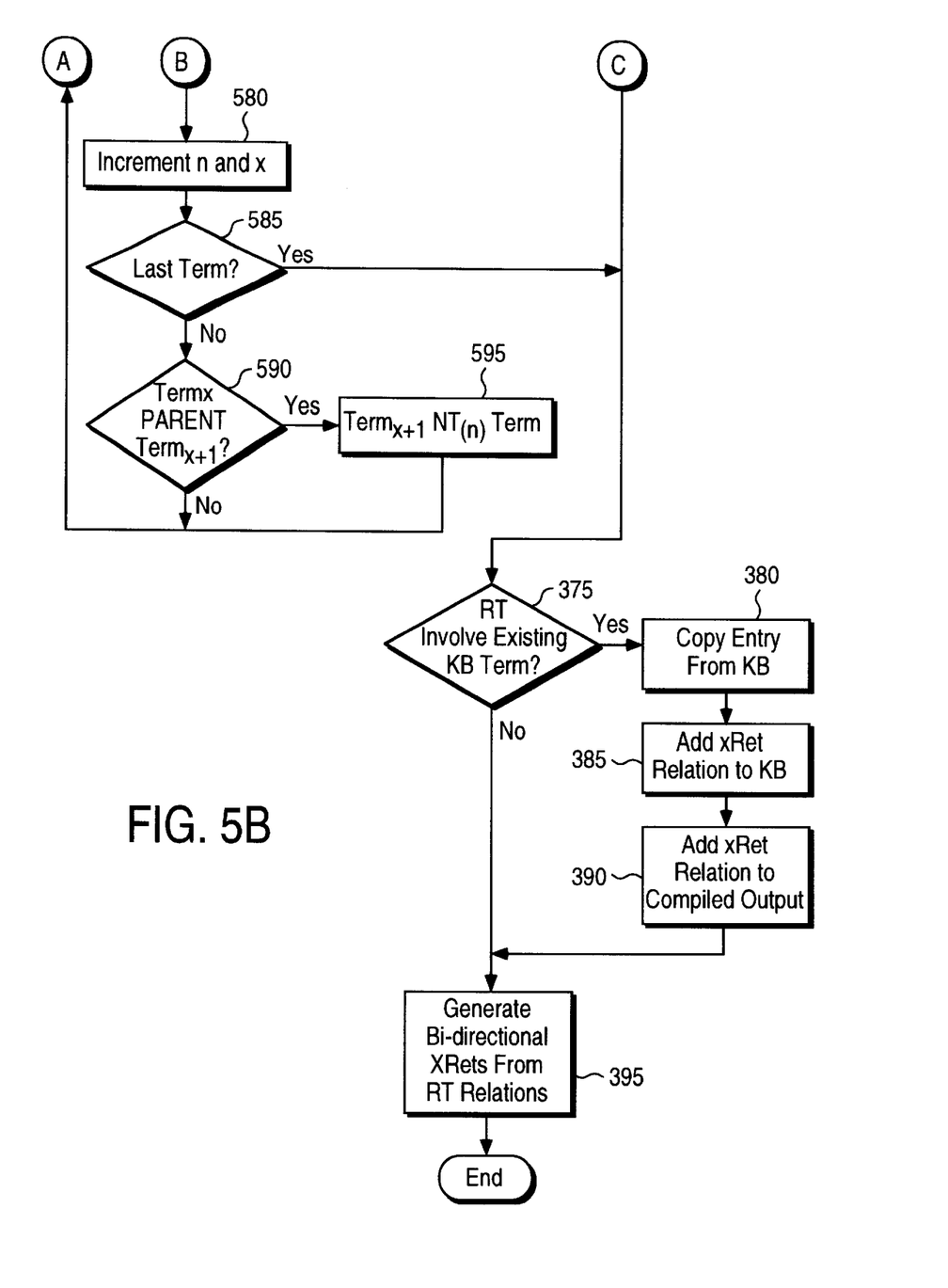

FIG. 5 is a flow diagram illustrating one embodiment for building a logical structure for hierarchical relations and cross-references. If an input term, designated $term_0$, is a top tree (TT term and the relation "terms PARENT $term_0$" exists, then the thesaurus compiler 30 generates the hierarchical relation, "$term_{0_{NT1}}$, $term_x$," (blocks 500 and 510, FIG. 5). For purposes of illustrating this embodiment, $term_x$, is define as a term in the input terminological information 110 (FIG. 1). If the relation $term_x$, PARENT $term_{x+1}$ exists, then the thesaurus compiler 130 generates the hierarchical relation, "$term_{x+1}$ $NT_{(n)}$ $term_x$," (blocks 520 and 530, FIG. 5). The process of assigning a level in the knowledge base 155 to the mapping occurs for each term in the input terminological information 110 (blocks 540 and 550, FIG. 5).

If $term_0$ is not a top level term and/or "$term_x$ PARENT $term_0$" relation does not exist, then the $term_0$ is matched to the appropriate level, $NT_n$, in the tree structure (blocks 500 and 565, FIG. 5). Similar to the process described above, the relations "$term_0$ PARENT $term_x$" and "$term_x$ PARENT $term_{x+1}$" are mapped to the appropriate level in the knowledge base 155 for each term in the input terminological information 110 (blocks 570, 575, 580, 585, 590, and 595, FIG. 5).

For each canonical X with the designation TT or $NT_n$ relation, a relation "X concept X" is generated (block 555, FIG. 5). Also, the relation "X RT Y" is translated to the relations "X XREF Y" and "Y XREF X" (block 560, FIG. 5).

The integration of user specified terminological information into a built-in knowledge base has application for use in specific domains. For example, an English language newspaper in India may buy a natural language processing system (e.g., Oracle® ConText®) to provide a search capability for their on-line edition. However, the newspaper agency may find that the built-in knowledge base has little or no knowledge of Indian politics and economics. For this hypothetical, the user desires to extend the built-in knowledge base to include terminological information on Indian politics and economics. The built-in knowledge base (e.g., knowledge base 155) has a category for "politics", but all subcategories associated with this node apply generally to United States politics. For this hypothetical, the India newspaper may build a hierarchy of terms for "Indian politics" under the existing "politics" category in the knowledge base. Specifically, names of major Indian political parties and politicians are organized and represented in the ISO-2788 thesaurus format. Table 3 shows an example input terminological information formatted in the ISO-2788 thesaurus format.

TABLE 3

Congress Party of India

BT politics
BJP

SYN Bharatiya Janata Party
Bharatiya Janata Party

BT politics
RT Hinduism

Figure 6A:
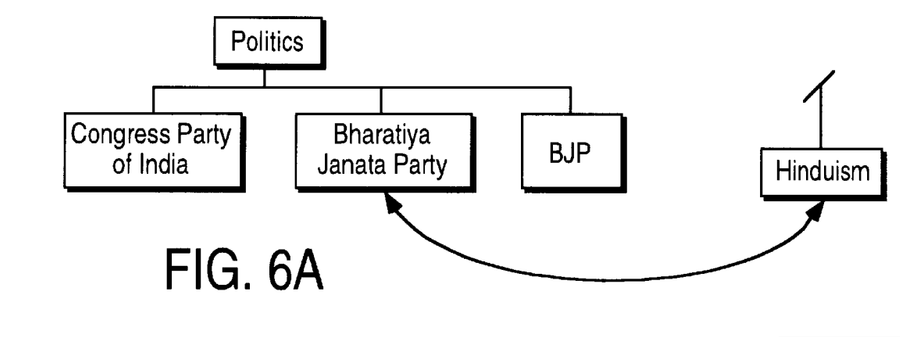
FIG. 6a illustrates a logical structure for the terminological information of Table 3 configured in accordance with one embodiment.

FIG. 6a illustrates a logical structure for the terminological information of Table 3 configured in accordance with one embodiment. Specifically, for this example, the categories "Congress Party of India" and "Bharatiya Janata Party" and "BJP" are children nodes under the existing "politics" category of the knowledge base. FIG. 6a also shows the related term (RT) relation between "BJP" and "Hinduism" through generation of a two-way cross-reference between the categories.

The terminological system also has application for use to generate logical structures detached from any ontology in the built-in knowledge base. For example, a customer may desire to add some foreign language (e.g., Hindi) terms that are commonly used in "Indian English." The customer of the natural language processing system may decide that it is useful to keep the foreign language terms separate from the rest of the terminology used in the natural language processing system (i.e., perhaps because the new ontology will be treated differently in the NLP application). For this example, a customer may build a thesaurus of terms that do not have any hierarchical (BT/N) or related terms that link the input terminological information to existing terms in the knowledge base. For this example, the thesaurus compiler creates a new tree of terms and augments the built-in knowledge base to include an additional independent ontology. Table 4 shows an example independent ontology for terms under the top level (TT) "Indian politics", formatted in the ISO-2788 standard.

TABLE 4

CPI

SYN Congress Party of India
BT Indian politics
Mrs. Gandhi

BT CPI

Figure 6B:
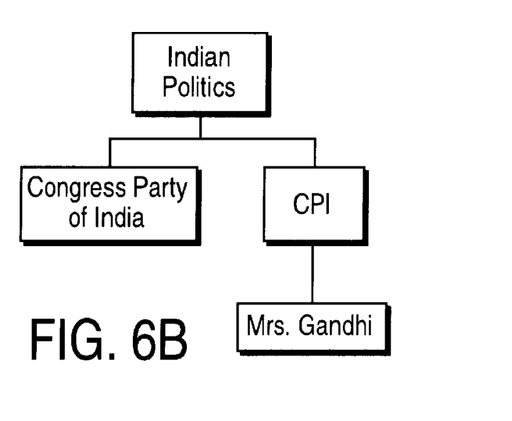
FIG. 6b illustrates a hierarchical structure for the example input terminological information of Table 4.

FIG. 6b illustrates a hierarchical structure for the example input terminological information of Table 4.

Figure 6C:
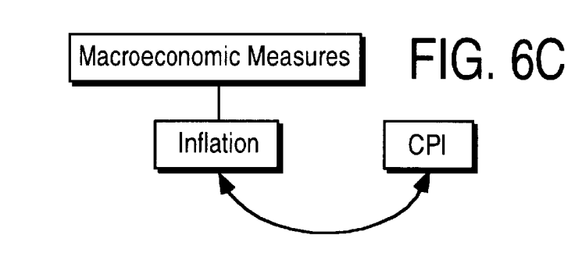
FIG. 6c illustrates an example portion of an ontology for the parent category "macro economic measures" for the built-in knowledge base example.

The terminological system 100 also "splices" two branches from different trees to integrate input terminological information to a built-in knowledge base. For example, the term "CPI" is a synonym for "Consumer Price Index" in the built-in knowledge base. However, in an Indian context, the term means "Congress Party of India." Table 4 shows example input terminological information formatted in the ISO-2788 standard. This example includes the term "CPI" in the Indian context. FIG. 6c illustrates an example portion of an ontology for the parent category "macro economic measures" for the built-in knowledge base example. As shown in FIG. 6c, the term "CPI" already exists in the "macro measures" branch. For this example, the user desires to associate the term "CPI" under the category "politics", but does not want to delete the term "Consumer Price Index." In addition, the user may not even know that "CPI" is mapped to the concept of "Consumer Price Index" in the built-in knowledge base. For this example, the terminological system 100 splices the "CPI" term from the economics branch, attaches it to the "politics branch" at the appropriate location, and sews the economics branch back together.

Figure 6D:
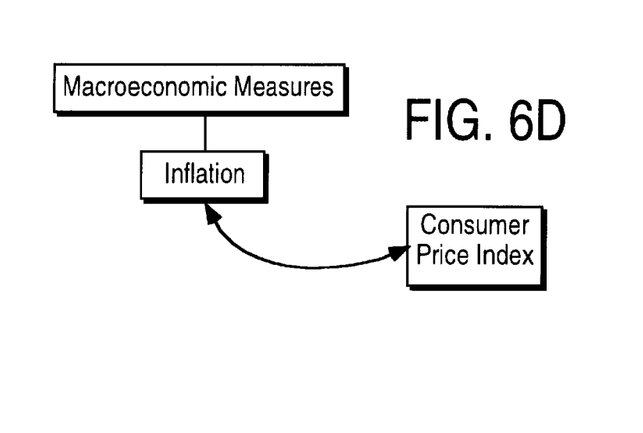
FIG. 6d illustrates one example of modifying the built-in knowledge base of FIG. 6c to avoid conflict with the input terminological information of Table 4 and FIG. 6b.

FIG. 6d illustrates one example of modifying the built-in knowledge base of FIG. 6c to avoid conflict with the input terminological information of Table 4 and FIG. 6b. Specifically, the built-in knowledge base was modified such that the category "inflation" now points to "Consumer Price Index", instead of "CPI." This operation occurs without the user having to recognize and resolve such conflicts or having to translate input terminological information to the internal representation formats used by the natural language processing system.

Figure 7:
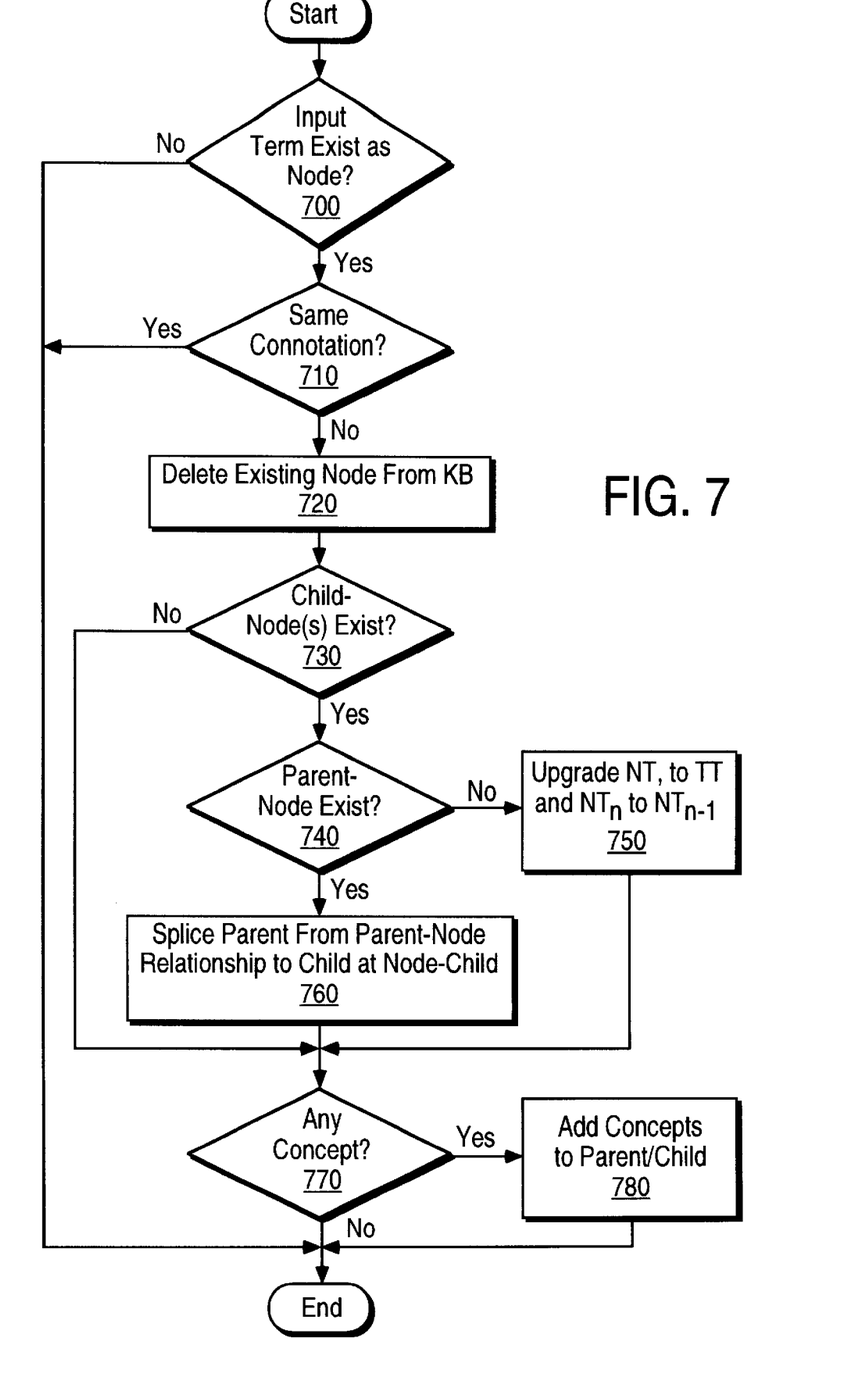
FIG. 7 is a flow diagram illustrating one embodiment for resolving conflicts among one or more terms of the input terminological information with terms of the built-in knowledge base.

FIG. 7 is a flow diagram illustrating one embodiment for resolving conflicts among one or more terms of the input terminological information with terms of the built-in knowledge base. If an input term exists as a node in the built-in knowledge base, and the input term and term of the knowledge base have the same connotation, then that existing node is deleted from the built-in knowledge base (blocks 700, 710 and 720, FIG. 7). If one or more child nodes exist and a parent node exists for that term, then the parent category of the relation parent-node is logically coupled to the child of the relation node-child (blocks 730, 740 and 760, FIG. 7). However, if a child node exists but a parent node does not exist, then hierarchy levels are upgraded from $NT_1$ to TT and from $NT_n$ to $NT_{n-1}$ (blocks 730, 740 and 750, FIG. 7). Also, if any concepts to the deleted node exist, then those concepts are mapped to the parent/child node (block 780, FIG. 7).

In one embodiment, the input terminological information 110 (FIG. 1) consists of up to sixteen thesauri. In one embodiment, the maximum length of a term is 80 characters. The following rules are implemented in a system in accordance with one embodiment. The broader term generic (BTG) and broader term partitive (BTP) are treated the same as the broader term (BT) relation. Similarly, narrower term generic (NTG) and narrower term partitive (NTP) are the same as narrower term since the knowledge base 155 embodiment does not distinguish between partitive and generic hierarchical relations. Only preferred terms have narrower term or related term relations. Other terms may or may not have a preferred term. If they do, they cannot have an NT or RT relation. If a term has no synonym (SYN) or preferred term (PT) it will be treated as its own preferred term. This in addition to the rule below guarantees that every term has exactly one canonical form. If a set of terms is related by SYN relations, only one of the terms is a preferred term. If a term that is not a preferred term has a broader term, it must be to the same term as the broader term of its preferred term. This guarantees that a term has only one parent in the knowledge base hierarchy. A top term may not have a broader term. Only preferred terms may be TTs. An existing term in the built-in knowledge base cannot be a TT. A preferred term that does not have a BT relation must be a TT (i.e., the root of every tree must be declared a top term). A BT or NT relation cannot be between two terms from the built-in knowledge base. There may be no cycles in BT and NT relations. A term can have at most one PT and at most one BT. A term may have any number of NTs. An RT of a term cannot be an ancestor or descendant of that term. A preferred term may have any number of RTs. The maximum height of a tree is sixteen, including the TT level. Although the above-identified rules facilitate integration of input terminological information for one embodiment of a built-in knowledge base (i.e., knowledge base 155), implementation of these rules are not required to integrate input terminological information into a built-in knowledge base.

Natural Language Processing System

FIG. 8 is a block diagram illustrating one embodiment for a natural language processing system incorporating the integrated knowledge base of the present invention. A natural language processing system 800 includes a content processing system 810 and a search and retrieval system 820. For this embodiment, the content processing system 810 receives discourse, denoted as documents 840, analyzes the documents, and generates classification as well as other information regarding the documents. One embodiment for a content processing system is described in U.S. Pat. No. 5,694,523. The content processing system integrates use of both the built-in knowledge base and the thesaurus output to analyze, classify and process the documents 840.

The search and retrieval system 820 receives an input search query 850, and generates output results 890, that include one or more relevant documents from a repository of documents 830. The search and retrieval system 820 utilizes an integrated built-in knowledge base and thesaurus output 870 to process the input search query 850 to generate the output results 890.

Computer System

Figure 9:
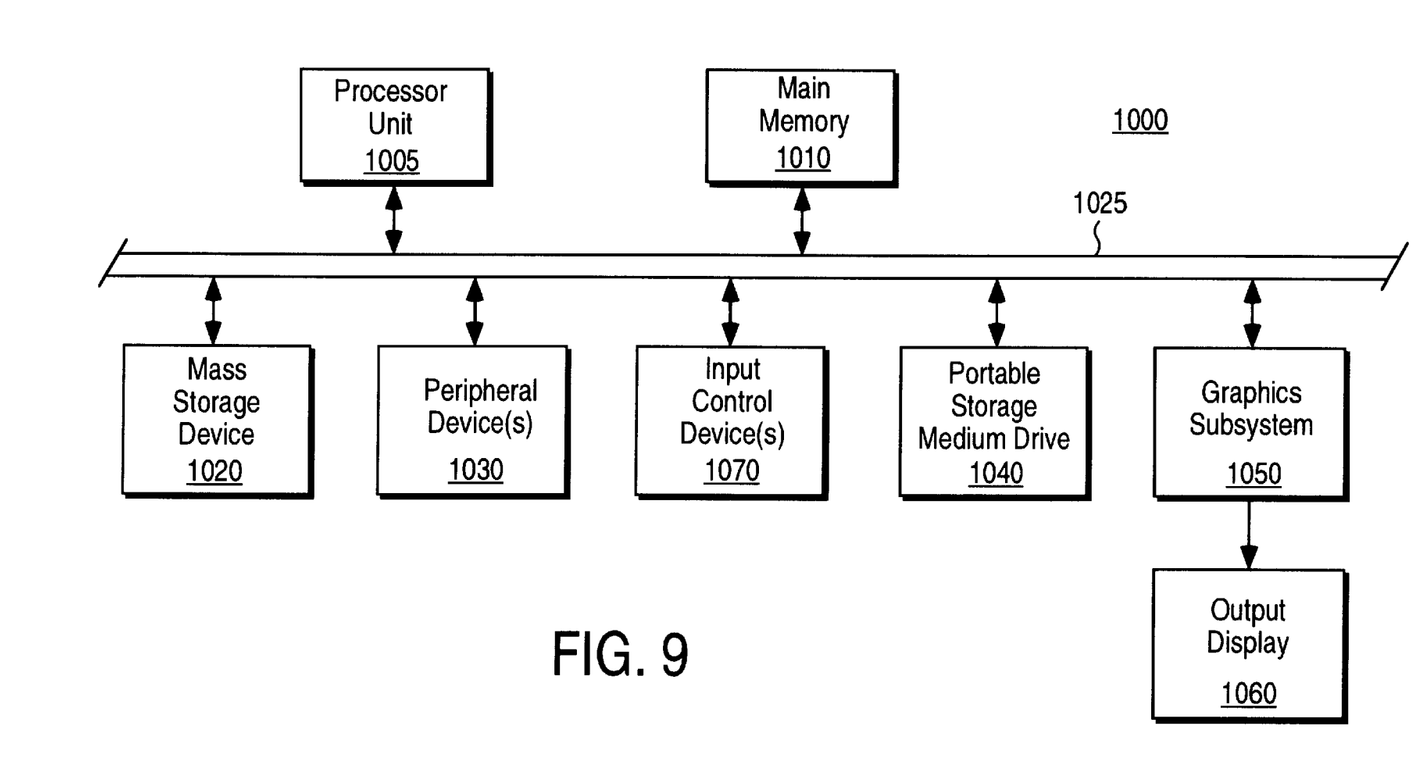
FIG. 9 illustrates a high level block diagram of a general purpose computer system in which the natural language processing system and thesaurus compiler of the present invention may be implemented.

FIG. 9 illustrates a high level block diagram of a general purpose computer system in which the natural language system and thesaurus compiler of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the natural language system and thesaurus compiler of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 9 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive (e.g., compact disc (CD)), is a non-volatile storage device for storing data and instructions for use by the processor unit 1005. In the software embodiment, the mass storage device 1020 stores the natural language system and thesaurus compiler software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the natural language system and thesaurus compiler software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, input terminological information may be input to the computer system 1000 via a portable storage medium or a network for processing by the thesaurus compiler.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The thesaurus compiler techniques may be implemented in either hardware or software. For the software implementation, the thesaurus compiler is software that includes a plurality of computer executable instructions for implementation on a general purpose computer system. Prior to loading into a general purpose computer system, the natural language system and thesaurus compiler software may reside as encoded information on a computer readable medium, such as a magnetic floppy disk, magnetic tape, and compact disc read only memory (CD-ROM). In one hardware implementation, the natural language system and thesaurus compiler may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A computer implemented method for automating integration of terminological information into a knowledge base, said method comprising the steps of:

receiving, into a computer, input terminology information comprising a plurality of input terms and information that specifies linguistic or semantic relationships among at least two of said input terms;

storing, in said computer, a knowledge base comprising a plurality of ontologies, each one of said ontologies comprising a plurality of nodes hierarchically arranged to depict linguistic and semantic relationships among said nodes, each node representing a term, wherein linguistic associations include associations between at least two terms where a term representing a child node is a type of a term representing a parent node, and semantic associations include associations between at least two nodes, although generally associated together, a node representing a child node is not a type of a concept representing a parent node;

parsing said input terminology information to generate a logical structure that depicts linguistic or semantic relationships among said input terms in a format compatible with said knowledge base;

determining whether at least one input term exists as a node in said knowledge base;

generating a new and independent ontology for said knowledge base comprising said logical structure of said linguistic or semantic relationships if none of said input terms exist as nodes in said knowledge base; and extending said knowledge base by storing data that logically couples said logical structure of said linguistic or semantic relationships to a node that matches an input term.

2. The method as set forth in claim 1, further comprising the steps of determining whether an input term that matches a terminological node in said knowledge base connotes a different meaning than said terminological node;

if so, then:

deleting said terminological node from its existing category—subcategory relationship;

logically coupling said parent in said category—subcategory relationship to said subcategory in said category—subcategory relationship to form a new category—subcategory relationship; and extending said knowledge base by logically coupling said input term to a node in said knowledge base.

3. The method as set forth in claim 1, wherein the step of receiving input terminology information comprises the step of receiving said terminology in an ISO 2788 format.

4. The method as set forth in claim 1, wherein:

the step of receiving input terminology information comprises the step of receiving broader term and narrower terms relationships among two input terms;

the step of storing a knowledge base comprises the step of storing categories hierarchically arranged to include parent-child relationships among categories related hierarchically; and the step of parsing said input terminology information to generate a logical structure comprises the steps of generating a parent-child relationship between two terms comprising a broader term (BT) relationship in said input terminological information, and generating a child-parent relationship between two terms comprising a narrower term (NT) relationship in said input terminological information.

5. The method as set forth in claim 1, wherein:

the step of receiving input terminology information comprises the step of receiving synonym relationships between two terms;

the step of storing a knowledge base comprises the step of storing categories hierarchically arranged to include parent-child relationships among categories related hierarchically; and the step of parsing said input terminology information to generate a logical structure comprises the steps of generating parent-child relationships between a common parent node in said knowledge base and said input terms specified as synonym relationships in said input terminological information.

6. The method as set forth in claim 1, wherein:

the step of receiving input terminology information comprises the step of receiving related term (RT) relationships among at least two input terms;

the step of storing a knowledge base comprises the step of storing categories hierarchically arranged to include cross reference (Xref) relationships among categories related; and the step of parsing said input terminology information to generate a logical structure comprises the step of generating cross references between terms comprising a related term (RT) relationship in said input terminological information.

7. The method as set forth in claim 1, wherein:

the step of receiving input terminology information comprises the step of receiving preferred term (PT) relationships among at least two input terms;

the step of storing a knowledge base comprises the step of storing a canonical/alternate form index that indexes a canonical form from one or more alternate form; and the step of parsing said input terminology information to generate a logical structure comprises the step of generating canonica/alternate form index between tenns comprising a preferred term (PT) relationship in said input terminological information.

8. A computer readable medium comprising a plurality of instructions, which when executed, causes the computer to perform the steps of:

receiving input terminology information comprising a plurality of input terms and information that specifies linguistic or semantic relationships among at least two of said input terms;

storing a knowledge base comprising a plurality of ontologies, each one of said ontologies comprising a plurality of nodes hierarchically arranged to depict linguistic and semantic relationships among said nodes, each node representing a term, wherein linguistic associations include associations between at least two terms where a term representing a child node is a type of a term representing a parent node, and semantic associations include associations between at least two nodes, although generally associated together, a node representing a child node is not a type of a concept representing a parent node;

parsing said input terminology information to generate a logical structure that depicts linguistic or semantic relationships among said input terms in a format compatible with said knowledge base;

determining whether at least one input term exists as a node in said knowledge base;

generating a new and independent ontology for said knowledge base comprising said logical structure of said linguistic or semantic relationships if none of said input terms exist as nodes in said knowledge base; and extending said knowledge base by storing data that logically couples said logical structure of said linguistic or semantic relationships to a node that matches an input term.

9. The computer readable medium as set forth in claim 8, further comprising the steps of
   determining whether an input term that matches a terminological node in said knowledge base connotes a different meaning than said terminological node;
   if so, then:
      deleting said terminological node from its existing category—subcategory relationship;
      logically coupling said parent in said category—subcategory relationship to said subcategory in said category—subcategory relationship to form a new category—subcategory relationship; and
      extending said knowledge base by logically coupling said input term to a node in said knowledge base.

10. The computer readable medium as set forth in claim 8, wherein the step of receiving input terminology information comprise the step of receiving said terminology in an ISO 2788 format.

11. The computer readable medium as set forth in claim 8, wherein:
   the step of receiving input terminology information comprises the step of receiving broader term and narrower terms relationships among two input terms;
   the step of storing a knowledge base comprises the step of storing categories hierarchically arranged to include parent-child relationships among categories related hierarchically; and
   the step of parsing said input terminology information to generate a logical structure comprises the steps of generating a parent-child relationship between two terms comprising a broader term (BT) relationship in said input terminological information, and generating a child-parent relationship between two terms comprising a narrower term (NT) relationship in said input terminological information.

12. The computer readable medium as set forth in claim 8, wherein:
   the step of receiving input terminology information comprises the step of receiving synonym relationships between two terms;
   the step of storing a knowledge base comprises the step of storing categories hierarchically arranged to include parent-child relationships among categories related hierarchically; and
   the step of parsing said input terminology information to generate a logical structure comprises the steps of generating parent-child relationships between a common parent node in said knowledge base and said input terms specified as synonym relationships in said input terminological information.

13. The computer readable medium as set forth in claim 8, wherein:
   the step of receiving input terminology information comprises the step of receiving related term (RT) relationships among at least two input terms;
   the step of storing a knowledge base comprises the step of storing categories hierarchically arranged to include cross reference (Xref) relationships among categories related; and
   the step of parsing said input terminology information to generate a logical structure comprises the step of generating cross references between terms comprising a related term (RT) relationship in said input terminological information.

14. The computer readable medium as set forth in claim 8, wherein:
   the step of receiving input terminology information comprise the step of receiving preferred term (PT) relationships among at least two input terms;
   the step of storing a knowledge base comprises the step of storing a canonical/alternate form index that indexes a canonical form from one or more alternate form; and
   the step of parsing said input terminology information to generate a logical structure comprises the step of generating canonical/alternate form index between terms comprising a preferred term (PT) relationship in said input terminological information.

15. A computer system comprising:
   an input device for receiving input terminology information comprising a plurality of input terms and information that specifies linguistic or semantic relationships among at least two of said input terms;
   memory for storing a knowledge base comprising a plurality of ontologies, each one of said ontologies comprising a plurality of nodes hierarchically arranged to depict linguistic and semantic relationships among said nodes, each node representing a term, wherein linguistic associations include associations between at least two terms where a term representing a child node is a type of a term representing a parent node, and semantic associations include associations between at least two nodes, although generally associated together, a node representing a child node is not a type of a concept representing a parent node;
   processor unit, coupled to said memory and said input device for parsing said input terminology information to generate a logical structure that depicts linguistic or semantic relationships among said input terms in a format compatible with said knowledge base, for determining whether at least one input term exists as a node in said knowledge base, generating a new and independent ontology for said knowledge base comprising said logical structure of said linguistic or semantic relationships if none of said input terms exist as nodes in said knowledge base, and for extending said knowledge base by storing data that logically couples said logical structure of said linguistic or semantic relationships to a node that matches an input term.

* * * * *

UNITED STATES PATENT AND TRADEMARK OFFICE
CERTIFICATE OF CORRECTION

PATENT NO. : 6,654,731 B1
DATED : November 25, 2003
INVENTOR(S) : Mahesh

It is certified that error appears in the above-identified patent and that said Letters Patent is hereby corrected as shown below:

<u>Column 14,</u>
Line 34, "tenns" should read -- terms --.

<u>Column 15,</u>
Line 17, "comprise" should read -- comprises --.

<u>Column 16,</u>
Lines 12-13, "comprise" should read -- comprises --.

Signed and Sealed this

Thirteenth Day of January, 2004

JON W. DUDAS
*Acting Director of the United States Patent and Trademark Office*